United States Patent [19]

Heling

[11] Patent Number: 4,639,038
[45] Date of Patent: Jan. 27, 1987

[54] VEHICLE EASY ENTRY SEAT TRACK WITH ONE POSITION MEMORY

[75] Inventor: Dennis H. Heling, Canton, Mich.

[73] Assignee: Chrysler Motors Corporation, Highland Park, Mich.

[21] Appl. No.: 751,708

[22] Filed: Jul. 2, 1985

[51] Int. Cl.$^4$ .............................................. B60N 1/04
[52] U.S. Cl. ..................................................... 297/341
[58] Field of Search ............... 297/341, 342, 340, 378, 297/379; 248/429, 430; 296/65 R

[56] References Cited

U.S. PATENT DOCUMENTS 4,143,911 3/1979 Sakakibara et al. ................. 297/341
4,159,147 6/1979 Kiyomitsu et al. .................. 297/341

FOREIGN PATENT DOCUMENTS 13220 2/1977 Japan ................................... 297/341

Primary Examiner—Peter A. Aschenbrenner
Assistant Examiner—Mark W. Binder
Attorney, Agent, or Firm—Edward P. Barthel

[57] ABSTRACT

A seat adjuster control mechanism for an easy entry vehicle seat track having a one position memory. An overcenter cam member is rotatably mounted on a pivotal latch plate pivoted on an upper track member. The latch plate has a detent normally biased into locking engagement with a lower track member by first spring means. Upon the seat being tilted forward a pawl, which pivots about a common axis relative to the latch plate, is rotated against the bias of second spring means and engages the latch for rotation in unison therewith. This results in pawl engaging means on the cam member releasing the pawl causing the cam member pivoted from a first pawl engaging overcenter position to a second overcenter position against the bias of third spring means. In its second overcenter position the cam member maintains the locking detent clear of its locked position enabling the seat assembly to be moved to its forwardmost easy entry and exit position. Upon the seat assembly being moved rearwardly the cam member engages a camming portion on the lower track returning the cam member to its first predetermined detent locking overcenter position automatically positioning the seat assembly in a neutral or one position memory location.

5 Claims, 14 Drawing Figures

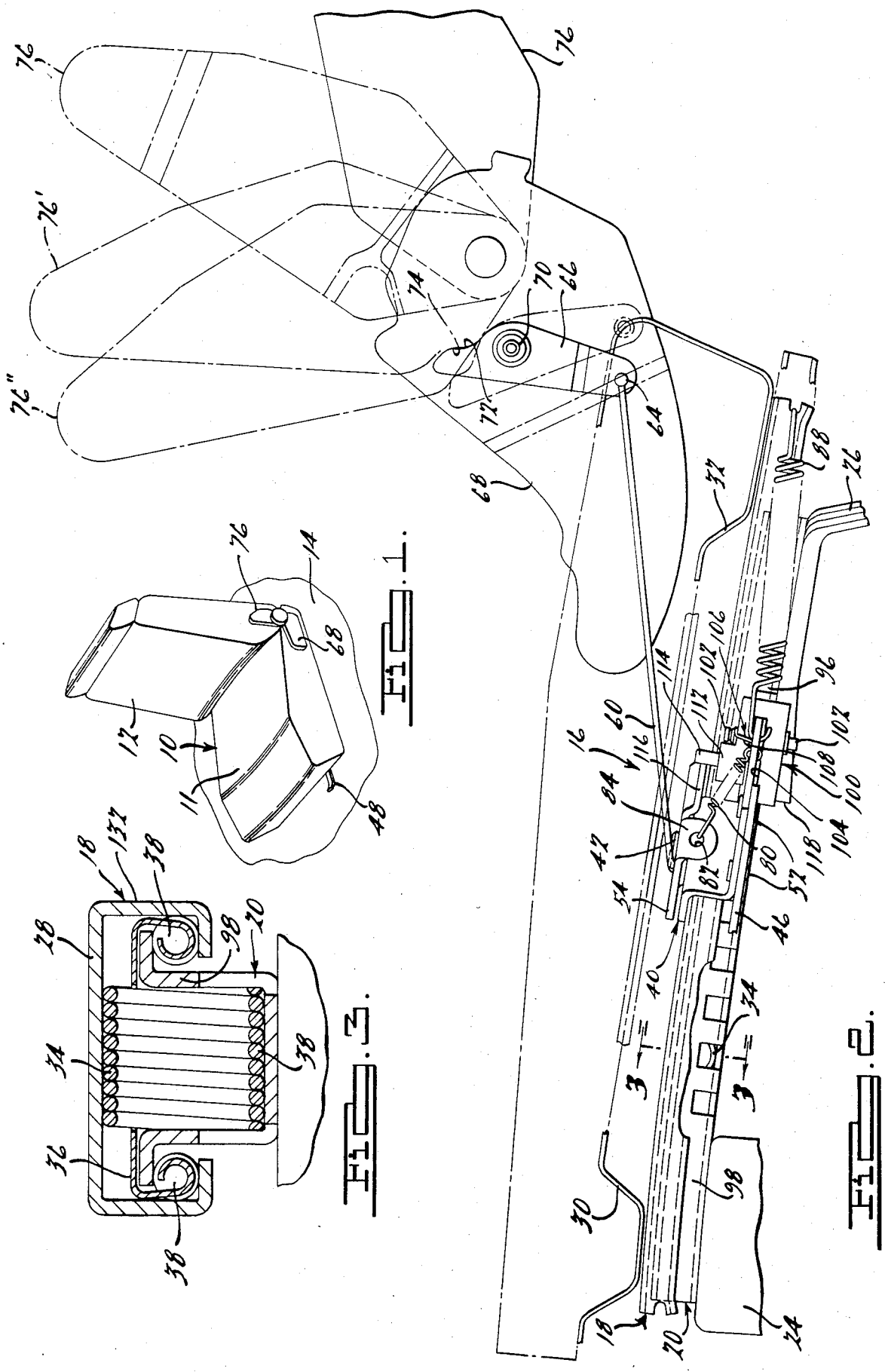

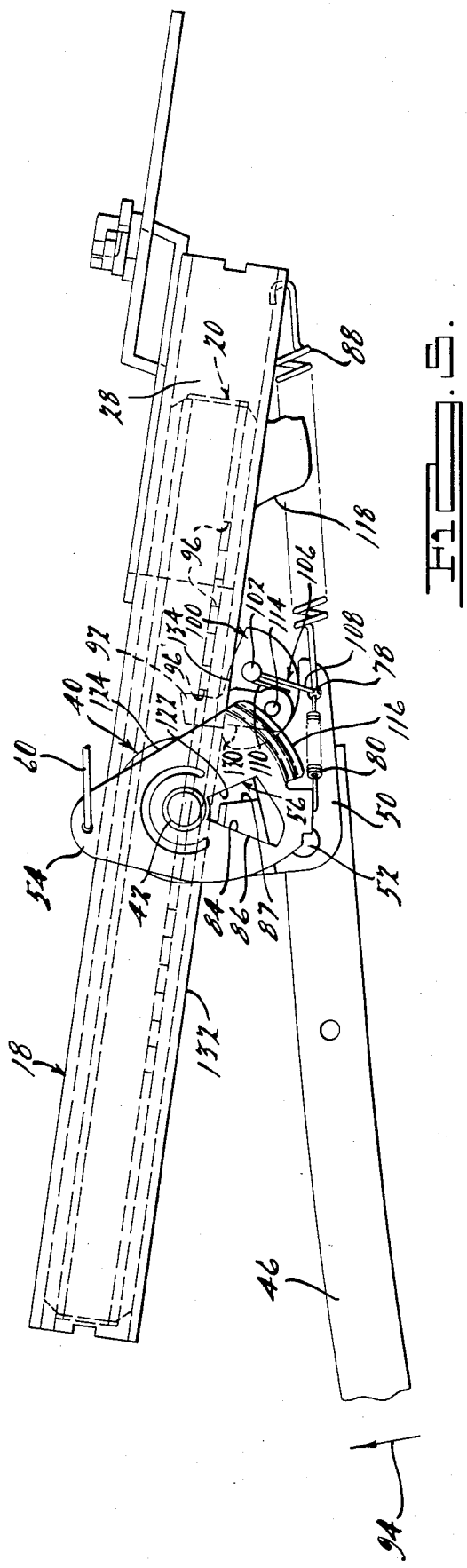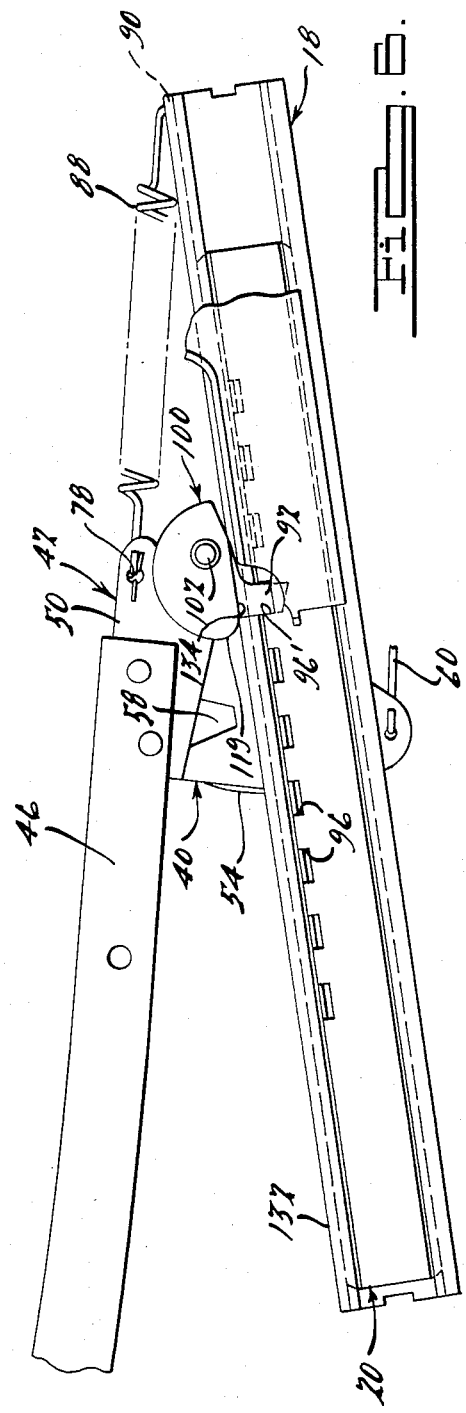

VEHICLE EASY ENTRY SEAT TRACK WITH ONE POSITION MEMORY

This invention relates to a vehicle seat assembly, and more particularly to a seat position control mechanism with memory which allows the seat to be readily moved forward to an easy entry or egress position and subsequently returned to a single neutral or memory position.

BACKGROUND OF THE INVENTION

The U.S. Pat. No. 4,065,178 to Carella et al discloses an easy enter seat assembly to permit fore and aft movement along a dual track assembly having a seat adjustment position member which engages stops attached to the seat cushion for limiting rearward movement of the seat cushion. The Carella patent has a tiltably supported seat back with long arms attached to a transverse shaft the ends of which engage the adjustment positions. A release lever is shown mounted at the seat back which allows forward movement of the seat cushion when the seat back is tilted in a forward direction. The foregoing is achieved without movement of the seat adjustment positioner which remains in place to relocate the seat cushion in its former position after the seat back is returned to its upright mode.

The U.S. Pat. No. 4,423,904 to Crawford discloses a seat position control mechanism having an actuating member secured to a tilting seat back and operatively connectable to an actuating member by a pawl and ratchet mechanism to dispose the seat forwardly to an easy enter position upon forward tilting movement of the seat back. Crawford employs a cam and follower arrangement to reduce a latch for the track mechanism upon coupling of the operating and actuating members. The Crawford seat back may be moved rearwardly to an inclined position without actuation of the seat position control mechanism.

The U.S. Pat. No. 4,449,752 to Yasumatsu et al discloses a Vehicle Seat Position Control Mechanism with Neutral Memory. The Yasumatsu et al mechanism is not incorporated with a seat back easy entry arrangement and is designed for a locking plate formed with locking teeth. The present invention is designed for a conventional upper and lower seat adjustment tracks having detent holes formed in the lower track for engagement by a latch plate detent.

SUMMARY OF THE PRESENT INVENTION

The present invention provides an improved and greatly simplified easy entry seat track assembly with one position memory for the front passenger seat of two door model vehicles. An overcenter cam member is rotatably mounted on a pivotal latch plate of a conventional vehicle seat adjustment mechanism. The latch plate is pivoted on an upper track member and has a detent normally biased in locking engagement with a lower track member by a first spring. Upon the seat back being tilted forward a pawl which, pivots about a common axis relative to the latch plate, is rotated against the bias of a second spring through a determined arc and engages the latch plate for rotation in unison therewith. This results in pawl engaging means, in the form of an upstanding pin on the cam member, releasing the pawl causing the cam member to be pivoted from a first predetermined pawl engaging overcenter position to a second stand-out overcenter position against the bias of a third torsion spring. In its second overcenter position the cam member maintains the locking detent clear of a series of detent openings on the lower track enabling the seat assembly to be moved to its forwardmost passenger easy entry and exit position.

Upon the seat assembly being moved rearwardly a determined distance the cam member engages a striker camming portion on the lower track causing the cam member to be returned by the torsion spring to its first detent locking overcenter position. Thus, the seat assembly is automatically locked in a neutral or one position memory location which is most convenient for a driver or passenger of average size.

BRIEF DESCRIPTION OF THE DRAWINGS

The above and other related objects and features of the invention will be apparent from a reading of the following description of the disclosure found in the accompanying drawings wherein:

FIG. 1 is a perspective view of an automobile seat assembly embodying the easy entry track with one position memory of the invention;

FIG. 2 is a side elevational view partly in section, of the track mechanism in its neutral position;

FIG. 3 is an enlarged vertical sectional view taken substantially on the line 3—3 of FIG. 2;

FIG. 5 is a fragmentary top elevational view of the track mechanism shown locked in its neutral position;

FIG. 6 is a fragmentary bottom elevational view of the track mechanism of FIG. 5;

DESCRIPTION OF THE PREFERRED EMBODIMENT

Figure 4:
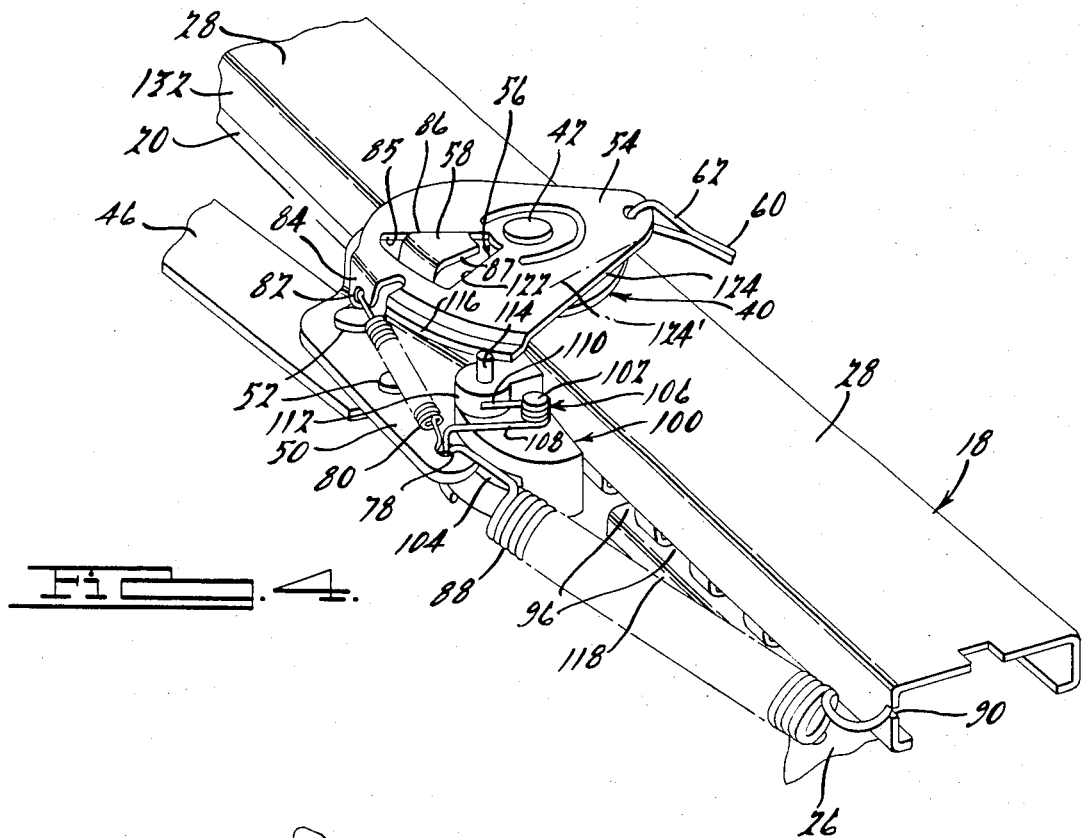
FIG. 4 is an enlarged fragmentary perspective view of the track latching mechanism of FIG. 2.

Referring now to FIG. 1 of the drawings, a vehicle seat assembly 10 according to the invention is shown positioned in the front or forward portion of the passenger compartment of a motor vehicle. The seat assembly is on the driver's side in the form shown thus the near side of the seat assembly in FIG. 1 is the outboard side of the vehicle. The vehicle seat assembly 10 includes a seat cushion 11 and a seat back 12. The seat cushion 11 is supported on vehicle floor 14 by a track mechanism, generally indicated at 16 in FIG. 2.

The track mechanism includes an upper track member 18 and a lower track member 20. As seen in FIG. 3 the upper track member 18 has a C-shaped cross section and is slidable on the generally U-shaped lower track member 20. The lower track member 20 is mounted on the vehicle floor 14 by fore and aft floor brackets 24 and 26, respectively. Wall portion 28 of the upper track member 18 is secured to the seat cushion 12 by conventional fore and aft channel shaped brackets 30 and 32, respectively.

A front compression coil spring 34 is shown in FIG. 3 transversely nested in the lower track 20. The spring 34 is rotatably retained by a conventional clip member 36 connected in any suitable manner to the upper track member 18 for travel therewith. Thus, the spring 34 rolls on lower track wall 38 as the upper track member 18 and seat cushion 11 slide fore and aft. The clip member 36 also seats ball bearings 38 between the parallel flanges of the track members providing smooth travel of the upper track member 18 on the lower track member 20 as the seat assembly is adjusted. A second coil spring and clip member arrangement (not shown) identical to spring 34 and clip 35 is provided adjacent the aft end of the track members.

As best seen in FIG. 4 the upper track member 18 supports a latch plate generally indicated at 40, for pivotal movement about a vertically extending pivot pin 42 mounted in the upper track wall 28. A manually operated control means in the form of a track release lever 46, having a handle 48 (FIG. 1), is fixedly attached to latch plate offset flange 50 by rivets 52.

As seen in FIG. 4 a pawl 54 is mounted on the latch plate 40 for pivotal movement about the pivot pin 42. The pawl 54 is formed with a generally triangular shaped aperture 56 receiving an upwardly extending raised stop 58 formed from the latch plate 40. The pawl 54 has one end of a wire pull rod 60 connected to its inboard end by a loop portion 62.

As seen in FIG. 2 the pull rod 60 extends rearwardly and upwardly with its aft end connected to rivet 64 at the lower end of a seat actuating tilt lever 66. The tilt lever 66 is pivotally connected to a seat cushion bracket arm 68 by pin 70 for pivotal movement about a transverse axis. The tilt lever 66 is formed with a notched portion 72 shaped to engage a complementary notch 74 formed in upper seat back bracket arm 76 shown in phantom lines in various tilt positions.

FIG. 4 shows the offset flange 50 of the latch member formed with a hole 78 adjacent is aft end through which extends a hook formed on one end of a second resilient means in the form of a first coil tension spring 80. The first tension spring 80 has its opposite end hooked in a hole 82 formed in depending ear 84 struck from the pawl 54. Thus, the second tension spring 80 operates to bias the pawl 54 in a counterclockwise direction. As a result leading edge 85 of the pawl's triangular aperture 56 is biased into contact with forward edge 86 of the stop 58 and away from stop opposite trailing edge 87.

A first coil tension spring 88 has its one end hooked into latch plate hole 78 and its opposite end hooked into a notch 90 formed in the rear edge of the upper track member 18.

FIGS. 5 and 6 show the latch plate offset flange 50 having a locking detent 92 extending laterally inboard therefrom. Upon manual rotation of the track lever 46 in a direction toward the track members, indicated by arrow 94 in FIG. 5, the latch plate 40 rotates about the pivot pin 42 in a clockwise direction. As a result the locking detent 92 is released from one of a series of detent lock openings 96 lanced in the outboard side flange 98 of the fixed lower track member 20. Thus, the second coil spring 88 biases the latch plate 40 in a counter-clockwise direction to normally retain detent 92 into locked engagement with one of the lower track detent openings 96.

FIGS. 2 and 4 show a cam member, generally indicated at 100, supported on latch plate offset flange 50 for rotational movement about cam pivot pin 102. As best seen in FIG. 4 the cam member 100 has a horizontal slot 104 formed therein which receives the rearward edge portion of the latch plate offset flange 50. An overcenter torsion third wire spring 106 has a central portion coiled around the cam pivot pin 102. The torsion spring has two ends extended to form a pair of arms wherein its one arm 108 is hooked in offset flange hole 78 and its other arm 110 engages a raised pillar 112 formed on the upper surface of the cam member. The torsion spring 106 operates to position the cam member in its first overcenter position so as to bias a vertical cam stop pin 114 into engagement with arcuate lip portion or edge 116 of the pawl 54 in the mode of FIGS. 5 and 6 with the locking detent 92 engaged in a predetermined lock opening 96.

Figure 14:
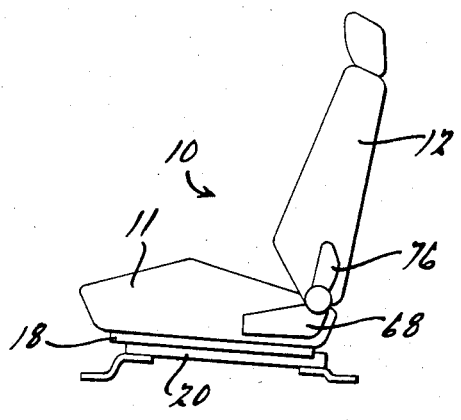
Figure 8:
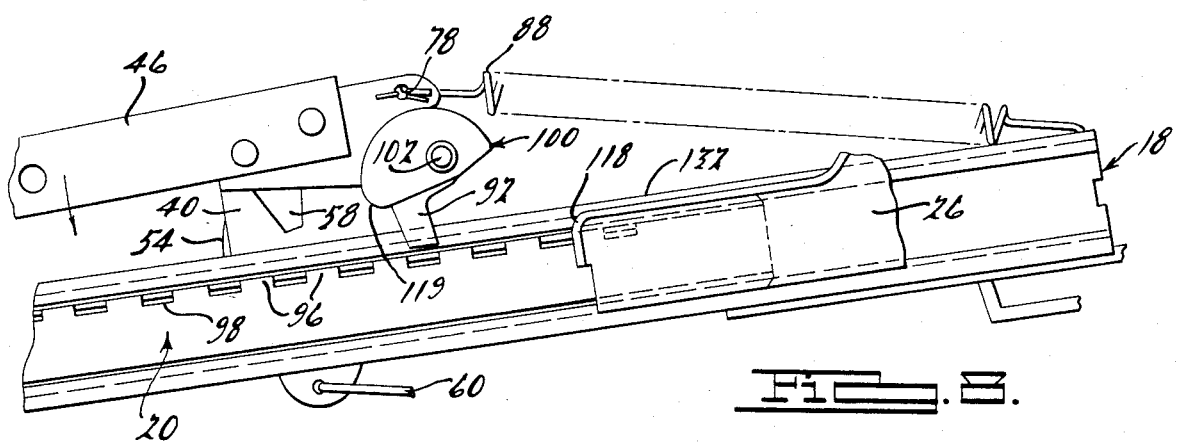
FIG. 8 is a fragmentary bottom elevational view of the track mechanism of FIG. 7.
Figure 10:
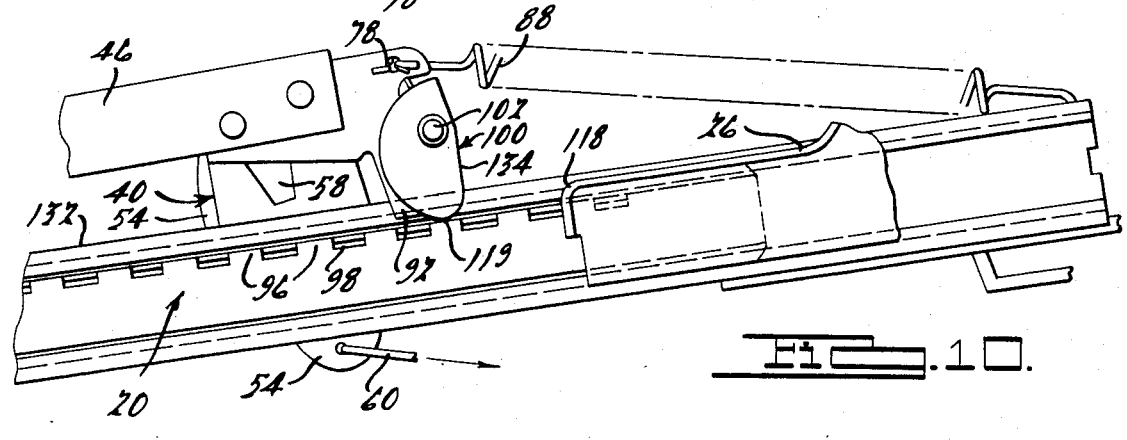
FIG. 10 is a fragmentary bottom elevational view of the track mechanism of FIG. 9, and FIGS. 11-14 are partially schematic side elevational views of the seat assembly shown in its various positions in accordance with the present invention.

It will be noted in FIGS. 8 and 10 that the seat cushion aft bracket 26 has a forwardly extending arcuate shaped striker camming surface 118 positioned in the path of rounded nose portion 119 of the cam member 100. Thus, upon the seat cushion and upper track member 18 being move rearwardly to a predetermined position indicated in FIG. 14 the cam member nose portion 119 will contact the camming striker surface 118 and trigger the cam member to a second overcenter position in a manner to be explained.

Figure 11:
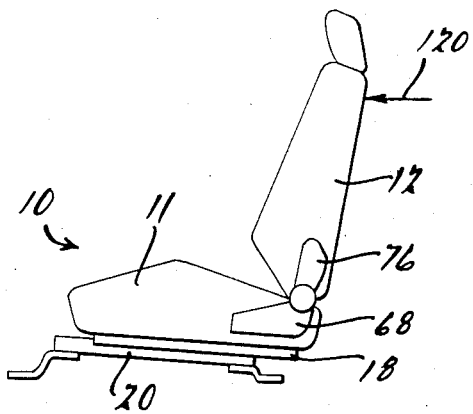
Figure 7:
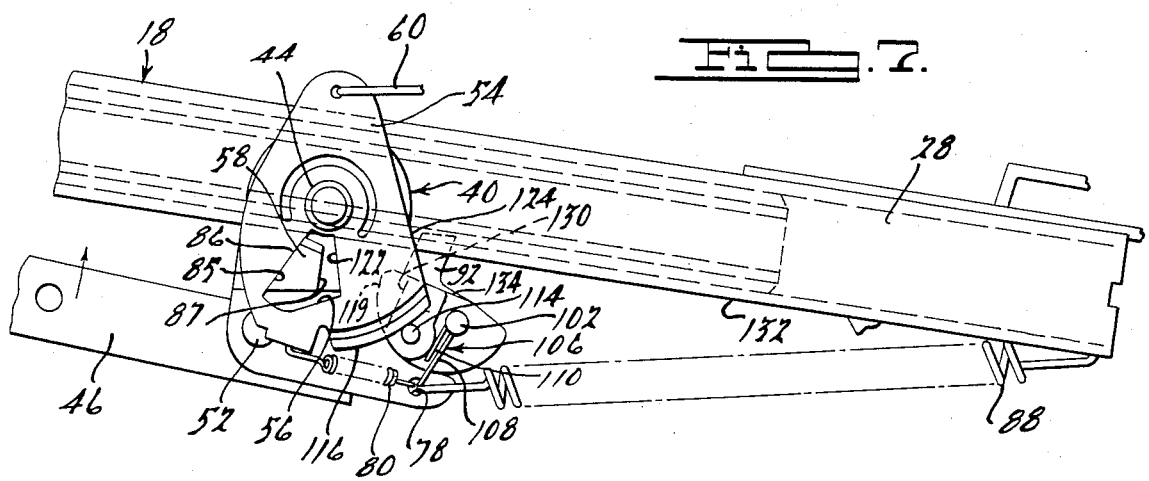
FIG. 7 is a fragmentary top elevational view of the track mechanism with the operating handle rotated to its latch detent unlocked position.

With reference to FIG. 11, there is shown a partially schematic view of the seat 10 having its seatback 12 locked in its normal upright position and with the upper track member 18 in its rearmost location blocking entry or exit from its associated rear seat (not shown). The locking detent 92 may be released by actuation of the release lever 46 from its normal position of FIG. 5 to its release position shown in FIG. 7 against the bias of first coil spring 88. It will be noted in the latch detent unlocked or release portion of FIG. 7 the stop 58 forward edge 86 remains in contact with the leading edge 85 of the triangular shaped aperture 56.

The operating mode for allowing back seat passengers to easily exit the vehicle is as follows. The passenger's hand applies a forward acting force to the seat back 12 at an approximate location indicated by arrow 120 in FIG. 11. The seat back 12 is tilted forward causing the bracket arm 76 to pivot forwardly through a predetermined angle, of about 30°, for example, to the bracket arm position 76' in FIG. 2. This initial seat back movement results in a pull on the wire rod 60 overcoming the second biasing spring 80 and initially rotating the latch plate 40 in a clockwise direction until the stop trailing edge 87 contacts rearward trailing edge 122 of the aperture 56. It will be noted in FIG. 4 that this initial rotation of the pawl 54 causes the pawl linear side edge 124 to be is rotated to its phantom line position 124' such that pawl arcuate shaped lip portion 116 disengages and clears cam pin 114.

Upon further forward movement of the seat back 12, the pull rod 60 causes both the latch plate 40 and pawl 54 to rotate in unison in a clockwise direction. Also, because cam pin 114 is clear of lip portion 116 the overcenter spring 106 causes the cam member 100 to rotate in a clockwise direction about its pivot pin 102 (FIG. 10) to a second stand-out overcenter position of FIGS. 9 and 10. In its second stand-out overcenter position the cam pillar member 112 has a second planar wall portion 130 maintained in flush contact with the upper track wall 132 by the overcenter spring 106. The cam member 100 has a first planar wall portion 134 disposed substantially normal to the second wall portion 130. As seen in in FIGS. 5 and 6, the first wall portion 134 is maintained in flush contact with the upper track wall 132 by the overcenter spring 106 in the cam member's first overcenter detent locked position.

Figure 12:
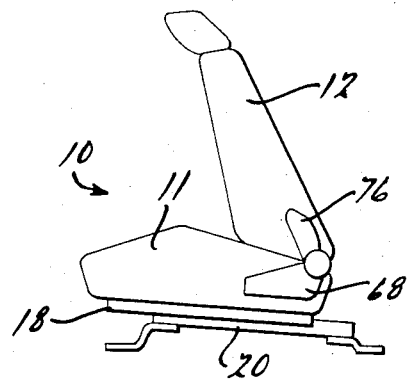
Figure 9:
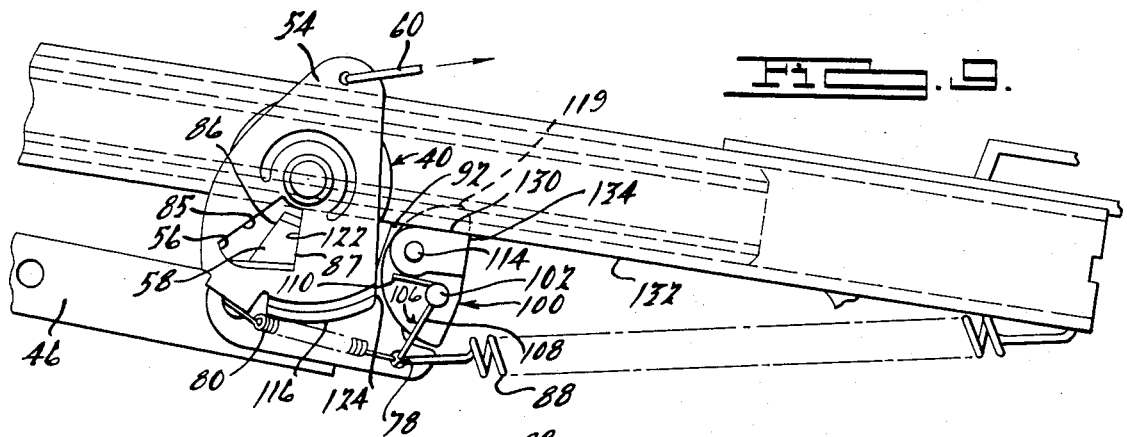
FIG. 9 is a fragmentary top elevational view of the track mechanism with the pawl and latch plate in their detent unlocked position.

In its FIG. 9 cam lock location the latch plate locking detent 92 is positioned in its unlocked mode, i.e., outboard of the lower track side flange 98 and detent openings 96 as seen in FIG. 10. The upper track and seat assembly are thus free to slide forward to the position shown in FIG. 12 allowing easy entry and exiting by the rear seat passenger. The locking detent 92 is positioned at its FIG. 9 released position upon the rear seat passenger exerting an initial predetermined force on the seat back which in the disclosed form is a force of about fourteen pounds. To attain a full forward tilt position of the seat back, the bracket arm 76 is moved to its 76'' position of FIG. 3. In this position the seat assembly 10 is moved forward to its FIG. 12 location by the rear seat passenger exerting an increased force, about sixteen pounds in the disclosed form, on the seat back 12 at the approximate location shown by arrow 120.

Figure 13:
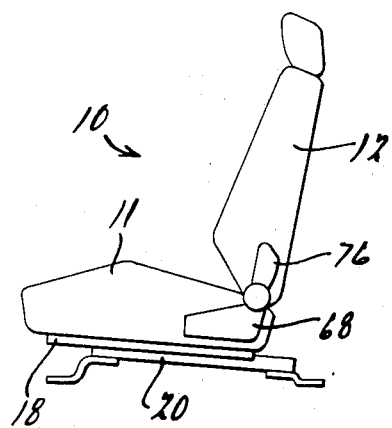

To reposition the seat assembly to its preselected neutral position a minimal rearward force is applied to the seat back 12 to return it to its upright neutral position shown in FIG. 13. This force may be either applied by a person outside the vehicle pushing on the seat back or a rear seat passenger pulling on the seat back after entering the vehicle.

Such a minimal rearward force on the seat back will cause the upper track member 18 and latching mechanism to slide rearwardly with the cam member 100 still in its stand-out second overcenter position shown in FIGS. 9 and 10. Upon the cam member nose portion 119 contacting the lower rail striker portion 118 the second overcenter bias position of the cam member is overcome. As a result the cam member 100 is rotated in a counterclockwise direction returning to its detent locking first overcenter position shown in FIG. 5.

It will be noted that as the cam member 100 rotates in a counterclockwise direction its cam pin 114 also rotates and contacts the linear edge 124 of the pawl 54. This causes the pawl 54 to rotate in a clockwise direction under the influence of the second spring 80 thus returning the cam pin 114 to its first overcenter position (FIG. 7) engaging pawl arcuate lip portion 116. At the same time the first spring 88 biases the latch plate 40 in a counterclockwise direction engaging locking detent 92 in a predetermined intermediate detent opening 96'. In the disclosed form the intermediate detent opening 96' is the fourth detent opening from the aft end of the lower track member 20. Thus, the subject seat assembly 10 is automatically locked in a predetermined single memory position of FIG. 14 which is most convenient for a driver of average body size.

Although a preferred embodiment of the invention has been illustrated and described in detail, it will be understood that various changes and modifications may be made in the disclosed embodiment without departing from the scope and spirit of the invention as defined in the appended claims.

What is claimed is:

1. In a vehicle easy entry seat including a seat cushion and a seat back pivoted thereto by hinge means for pivotal movement between an upright position and a forward tilted position, an upper track member fixed to said seat cushion and a lower track member fixed on the vehicle for relative longitudinal movement of the seat cushion upper track on said lower track to a plurality of adjusted positions, said lower track member having a plurality of longitudinally spaced lock openings, a seat adjuster control mechanism comprising in combination; a latch plate formed with a locking detent pivotally mounted on said upper track member, first resilient means biasing said latch plate in a first rotational direction such that its locking detent is held in locked engagement with one of said lower track member openings, a pawl pivotally mounted on said latch plate, stop means on said latch plate positioning said pawl at either a first or second predetermined rotated position relative to said latch plate, second resilient means biasing said pawl in said first rotational direction into said first position, a cam member pivotally mounted on said latch plate, said cam member having means for engaging said pawl preventing rotation of said cam member in a second rotational direction when said pawl is positioned in its first rotated position, said cam member comprising a first planar wall portion and a second planar wall portion disposed in substantially normal relation to each other, third resilient means operative for biasing said cam member in either a first or second overcenter position, a lever member rotatably supported on said hinge means, link means connecting said lever member to said pawl, such that when said seat back is partially tilted forward said pawl is pivoted by said lever member to its second rotated position, wherein said cam member engaging means is moved out of contact with said pawl, and whereupon said seat back being tilted to its full forward position said latch plate and said pawl are pivoted in said second direction, whereby said locking detent is moved to its unlocked position out of engagement with its associated lower track member opening thereby allowing said upper track member to move forwardly on said lower track member to an easy entry or egress position, said third resilient means operative upon said engaging means on said cam member being moved out of contact with said pawl to rotate said cam member to its second overcenter position, whereby said cam member first planar wall portion is moved away from a position contacting a side wall of said upper track member and said second planar wall portion moved to a position slidably engaging said upper track member side wall so as to maintain said locking detent in its unlocked position during longitudinal movement of said upper track member, and camming means on said lower track member operative to engage said cam member upon said upper track member being moved rearwardly to a predetermined location, and wherein said cam member is rotated in said first direction for return to its first overcenter position allowing said first resilient means to rotate said locking plate in said first direction such that said locking detent engages a predetermined single-position memory opening in said lower track with said cam member first planar wall portion again in flush contact with said upper track member side wall, while said second resilient means rotates said pawl in said first direction to its first position whereby said cam member engaging means again engages said latch plate.

2. The vehicle easy entry seat adjuster control mechanism as set forth in claim 1, wherein said cam member engaging means in the form of a vertically disposed stop pin on said cam member operative for biased engagement with an arcuate shaped lip portion of said pawl.

3. The vehicle easy entry seat adjuster control mechanism as set forth in claim 1, wherein said first resilient means in the form of a first coil tension spring connected between said latch plate and an aft portion of said upper track member.

4. The vehicle easy entry seat adjuster control mechanism as set forth in claim 1, wherein said second resilient means in the form of a second coil tension spring connected between said latch plate and said pawl.

5. The vehicle easy entry seat as set forth in claim 2, wherein said cam member is pivotally mounted on said latch plate by a vertically disposed pivot pin having a portion extending above said cam member and wherein said third resilient means in the form of a wire torsion spring having a central coiled portion and two free ends, said central portion coiled around said cam pivot pin vertically extending portion, said wire spring two free ends extended to form first and second arms, said first arm connected to said latch member and said second arm in resilient contact with a raised pillar formed on the upper surface of said cam member.

* * * * *